Nov. 16, 1965  F. F. HILTZ  3,218,475
ARTIFICIAL NEURON
Filed Oct. 2, 1962  7 Sheets-Sheet 1

Frederick F. Hiltz
INVENTOR

BY Claude Funkhouser
ATTORNEY

FIG. 2A.

FIG. 3. FACILITATION — STEADY-STATE REP-RATE OF 5 PPS WITH HYPERPOLARIZING FEEDBACK

FIG. 4. ADAPTATION — STEADY-STATE REP-RATE OF 5 PPS WITH HYPERPOLARIZING FEEDBACK & FACILITATION

FIG. 5. ADAPTATION

FIG. 6. ADAPTATION (WITH HYPERPOLARIZING FEEDBACK)

FIG. 7. REPETITIVE FIRING

FIG. 8.
STENGTH LATENCY

Frederick F. Hiltz
INVENTOR

Nov. 16, 1965          F. F. HILTZ                3,218,475
                     ARTIFICIAL NEURON
Filed Oct. 2, 1962                              7 Sheets-Sheet 7

FIG. 9. ACCOMODATION $\Delta_T$ MEASURED FROM APPLICATION OF RAMP TO START OF A.P., OR THRESHOLD.

FIG. 12.

Frederick F. Hiltz
INVENTOR

BY Claude Funkhauser
ATTORNEY

United States Patent Office 3,218,475
Patented Nov. 16, 1965

3,218,475
ARTIFICIAL NEURON
Frederick F. Hiltz, Kensington, Md., assignor to the United States of America as represented by the Secretary of the Navy
Filed Oct. 2, 1962, Ser. No. 227,965
12 Claims. (Cl. 307—88.5)

This invention relates in general to electronic analog simulators and, more particularly, to an electronic analog simulator utilizing a linear operational amplifier circuit in its forward path, and a non-linear element in its feedback path.

Achieving an accurate analog model of a neuron will permit a closer study of an individual nerve cell or of nervous systems constituted by several interconnected nerve cells. Information transfer between groups of cells forms a very important area of investigation, and includes information reception, transfer, reduction and utilization by these nervous systems. These cells are able to perform their above functions by methods which are yet to be copied by man. However, by constructing an analog model of these nerve cells, it is possible to investigate their various forms of information transfer by connecting two or more cells together.

An analog model of a neuron has distinct advantages over its digital counterpart. One of these is that it can be used by an experimenter who is relatively untrained in electronics. Therefore, the analog model is available to many interested parties who can not use a digital model of a neuron. An accurate analog mode is inexpensive as compared to its digital counterpart. Additionally, the parameters of the analog model may be varied with ease during an experiment, if so desired, and the experiment may be done in "real time," that is, the actual time related to the biological specimen of interest in the experiment.

One object of the present invention, therefore, resides in providing an analog circuit which exhibits neuronal characteristics.

Another object of the invention is to provide an accurate model of a neuron, yet one that can be used without operational difficulty.

A further object of the invention is to provide an accurate model of a neuron which is adjustable in its operating characteristics.

Other objects and many of the attendant advantages of this invention will be readily appreciated as the same becomes better understood by reference to the following detailed description when considered in connection with the accompanying drawings, wherein:

A neuron exhibits several characteristics of action, but possesses two conditions of action. The condition of a cell may be either on or off. When a cell is in the off condition, it generates electrical impulses of a very low amplitude, but by changing to the on condition, the cell generates an electrical pulse which then propagates to other cells. This pulse, generated by the cell changing to the on condition, is called an "Action Potential." However, "Action Potentials" may have differing output features or characteristics because of the different internal operational modes of the neuron.

The neuron also has two modes of operation, associated with different types of input signals, which can be designated synaptic or non-synaptic, and either can be excitatory or inhibitory. An excitatory mode of operation produces an "Action Potential," and no "Action Potentials" are produced during an inhibitory mode of operation. However, for purposes of clarity, when discussing the non-synaptic or direct inputs, the excitatory signal is designated *depolarizing* and the inhibitory signal is designated hyperpolarizing. Additionally, the part of the nerve cell that generates an "Action Potential" is called a neuron. However, the neuron may only generate an "Action Potential" after its minimum threshold for producing has been exceeded.

Briefly, this invention simulates all the major electrical characteristics of the described neuron by electronic means. The artificial neuron is an operational amplifier with its non-linear feedback path, and the various modes of operation are determined by associated active or passive input networks. The internal characteristics of action, and the output features of the "Action Potential" are determined by various feedback loops.

Figure 1:
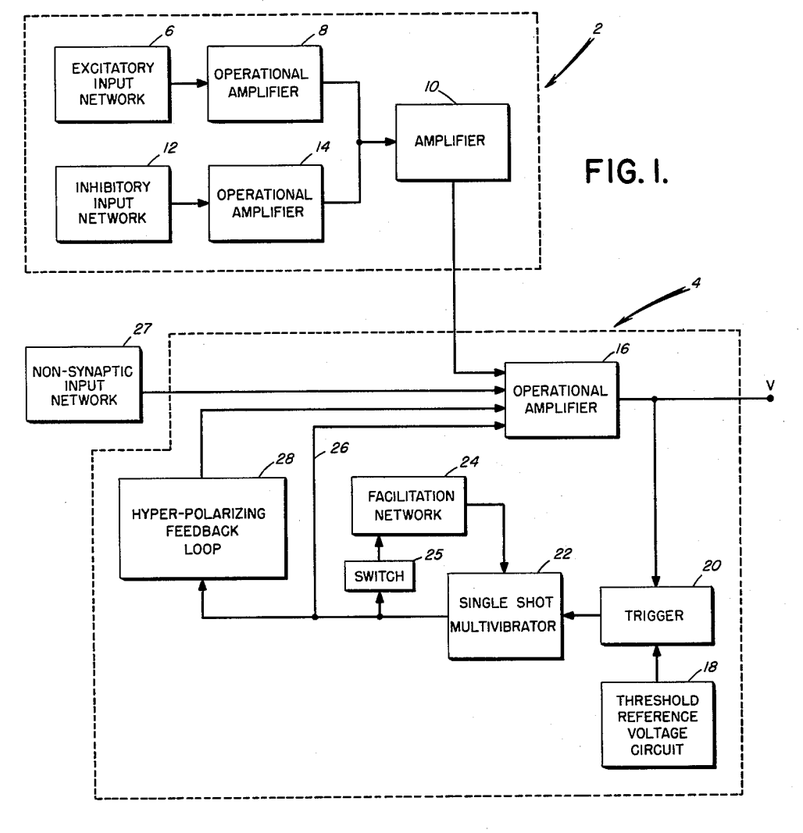
FIG. 1 is a generalized block diagram of an embodiment of the invention.

Referring to FIG. 1, there can be seen a block diagram of the neuron model which includes a Synapse 2 and a neuron 4. The Synapse 2 provides a means by which indirect or pre-synaptic input signals are summed, shaped and prepared prior to their application to the neuron 4. An excitatory indirect signal enters the Synapse by means of an excitatory input network 6. The excitatory indirect signal is one which may cause an "Action Potential" when it causes the voltage level at the output of the neuron to exceed the minimum threshold value. The output of the network 6 is applied to an operational amplifier 8 which allows the full signal strength of successive input signals to pass, and does not reduce the change of amplitude of these succeeding input pulses by gradually building up a barrier over which the input pulses must pass. The adverse action avoided by the amplifier 8 is very similar to the action associated with the back biasing of a passive RC circuit. In a passive RC circuit, successive input pulses increase the back biasing voltage, and therefore require subsequent pulses to overcome the biasing voltage, thereby causing a proportional reduction in output amplitude to the amount of the biasing voltage.

The output of the amplifier 8 is applied to an amplifier 10 having active gain and providing the correct amplitude and polarity change in its output signal for the subsequent application of the output signal to the neuron 4.

Indirect signals of an inhibitory nature enter the Synapse by means of an inhibitory input network 12. Such signals tend to suppress the neuron 4 from producing an "Action Potential." The output of the network 12 is applied to an operational amplifier 14 which is similar in both design and purpose to the amplifier 8. The output of the amplifier 14 is applied to the amplifier 10. The amplifier 10 sums the excitatory and inhibitory input signals, and applies the resultant signal to an operational amplifier 16.

The amplifier 16 is a voltage source from which power is drawn to provide an output pulse, corresponding to an "Action Potential" of a neuron. An "Action Potential" is produced whenever the amplifier 16 produces a signal, called a transmembrane potential, at its output that is determined to be above the threshold voltage, provided by a threshold reference voltage circuit 18; the two being compared in a trigger circuit 20. When the transmembrane voltage exceeds the threshold voltage, the trigger circuit causes a single shot multivibrator 22 to change its state. The output of the multivibrator 22 may be connected to a facilitation network 24 by a switch 25. The multivibrator 22 forms a feedback loop to the amplifier 16 by way of line 26. When the output pulse from the multivibrator is applied to the amplifier 16, it initiates the production of a sharp output transmembrane voltage pulse which is the "Action Potential." When the facilitation network 24 is connected into the circuit, it performs its feedback function in a special way, whereby it controls the time duration of the "Action Potential" and operates to describe an additional internal characteristic of the neuron.

The form of facilitation in this invention is a phenomenon whereby a neuron may "count" the number of times it has produced an "Action Potential." If a neuron has been quiescent for a sufficiently long period of time, and then is caused to produce an "Action Potential," the width of the "Action Potential" increases with the number of "Action Potentials" from a minimum width, until a point of saturation, or maximum width, is reached. The facilitation network causes the saturation point to be reached after 65 to 75 pulses, and the width of the "Action Potential" to be widened from 8 milli-seconds to 12.5 milli-seconds. After saturation, if the simulated neuron is continuously generating "Action Potentials" at some minimum interval, the pulse width will not decay back to a smaller value. However, if for some reason, the neuron ceases to generate "Action Potentials" for several minutes, the width of the pulse will return to 8 milli-seconds for future pulses. A further feature of facilitation is that if the simulated neutron ceases to generate "Action Potentials" for a short period of time and then begins again to generate "Action Potentials," the pulse width will begin to widen again. Its initial width for this subsequent generating of "Action Potentials" is time dependent upon how long ago it had previously ceased to generate output pulses, and also upon the width of the pulse upon cessation.

A non-synaptic or direct input network 27 provides a means by which direct or non-synaptic signals are applied to the amplifier 16. These direct signals are either depolarizing or hyperpolarizing in nature. A depolarizing signal is a positive direct current level or a positive direct current "ramp" signal.

Upon application of a depolarizing input of sufficient strength to the amplifier 16, it produces a series of "Action Potentials" equally spaced and of equal amplitude. As the amplitude of the depolarizing input is increased, a point is reached where the amplifier produces an "Action Potential" only once, regardless of the time duration of the applied depolarizing input. However, increasing the depolarizing amplitude still further produces more "Action Potentials," until the amplitude of the depolarizing input signal is sufficient to cause a steady-state response of the simulated neuron by generating a constant train of "Action Potentials."

A depolarizing input signal which produces this type of steady-state response of the neuron 4, causes an additional internal chracteristic of the neuron 4. This effect is the changing of the frequency of the generated "Action Potentials," without a further change in the depolarizing input signal. Initially, the frequency of the "Action Potentials" is high and then it gradually slows down to a steady-state value. The instant invention has an interval stable range from twenty-five pulses per second to two pulses per second. The large dynamic range is accomplished in part by introducing a hyperpolarizing feedback loop 28 between the output of the multi-vibrator 22 and the amplifier 16. This feedback loop is of opposite pulse polarity from the normal feedback which produces an "Action Potential." This feedback loop 28 stabilizes the pulse intervals at low frequencies and extends the low frequency range. It also serves to elaborate the adaptation feature, which is the slowdown in frequency with time after application of a step depolarizing input signal.

A hyperpolarizing, non-synaptic direct input signal has the effect of inhibiting the simulated neuron 4 from producing an "Action Potential." The comparison between a direct input signal and the threshold reference voltage is made in the same way as the comparison was made with the indirect signal. This comparison determines whether an "Action Potential" will be produced.

Figure 2A:
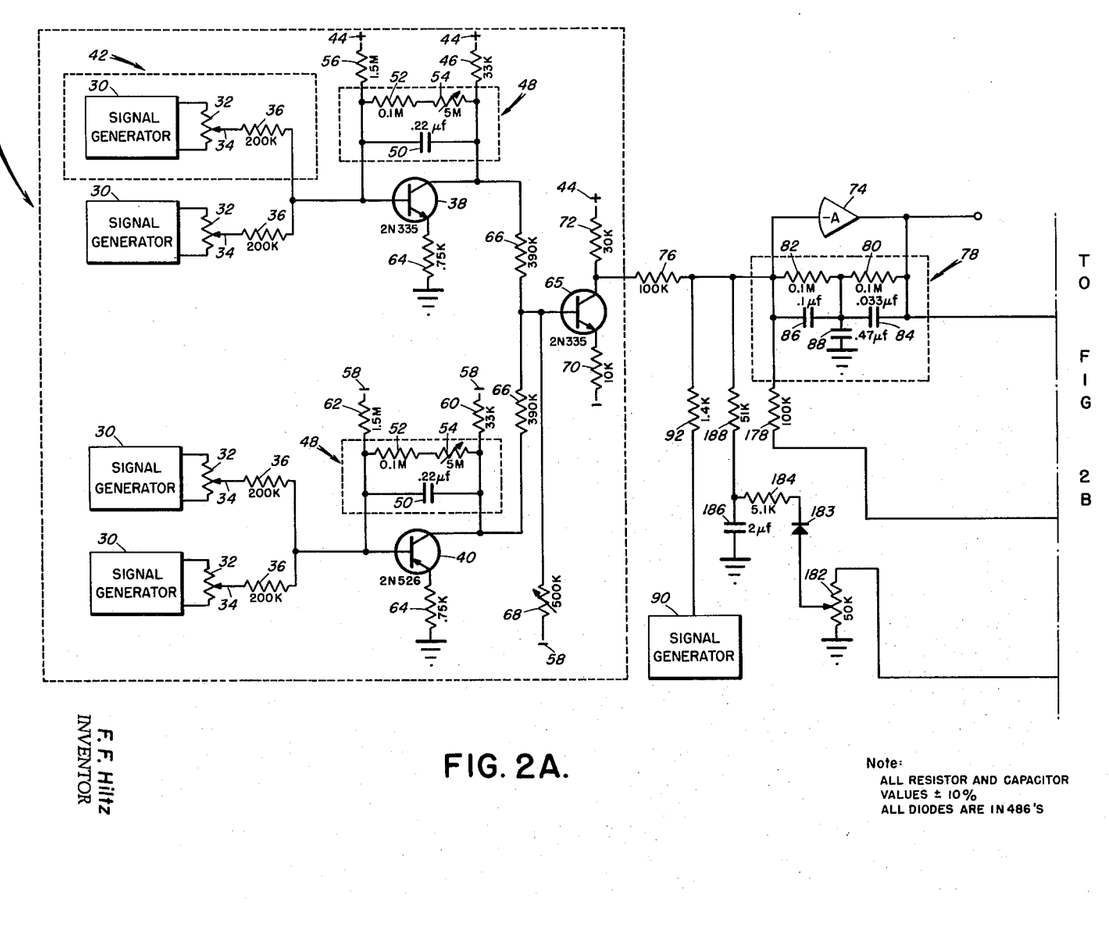
FIGS. 2a and 2b combine to form a schematic diagram of an embodiment of the invention.
Figure 2B:
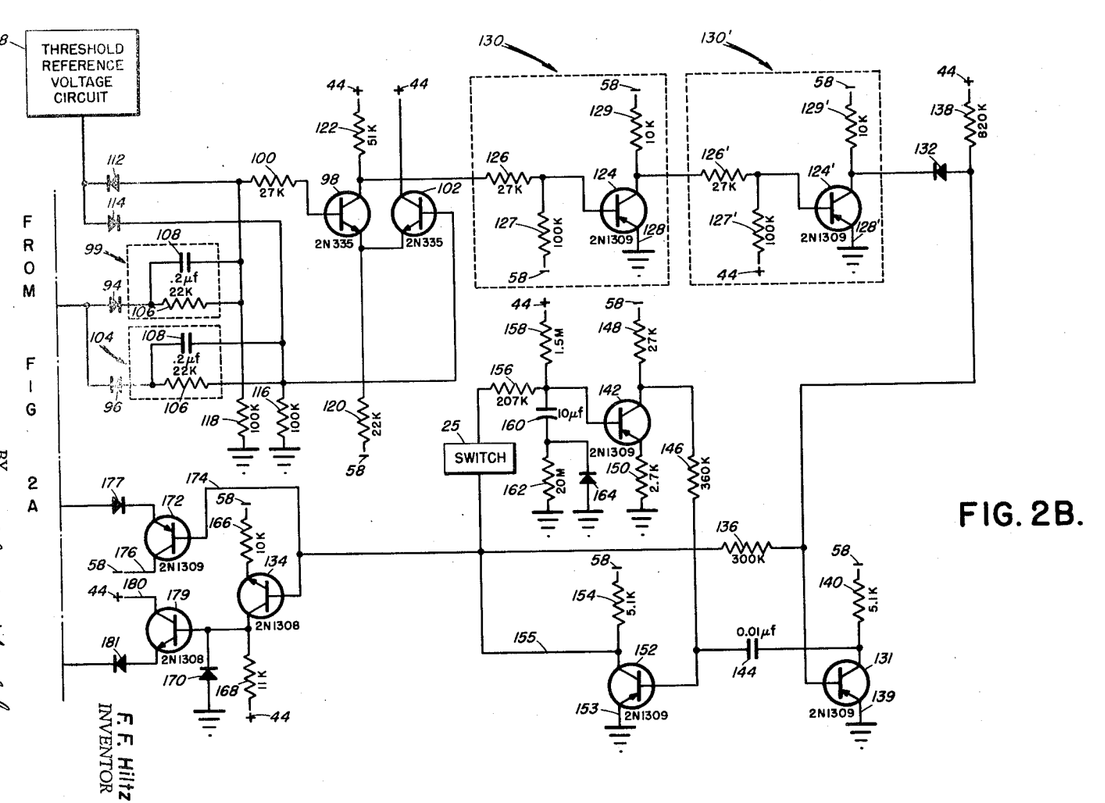

Referring to FIG. 2, there can be seen a schematic diagram of the electronic neuron model which includes the Synapse 2. A plurality of signal generators 30, of any commercial design, is used as a signal source in FIG. 2A. An input signal consists of a single pulse or a train of pulses. However, to investigate the diverse behavior of a nerve cell, it is necessary to vary the form of the activating input signal and to note the reaction of the cell as described by the waveform of its output signal. Therefore, the input signal may vary in amplitude, frequency and pulse duration. For the purpose of this discussion indirect excitatory signals are positive going signals from zero reference, while indirect inhibitory signals are negative going from zero reference. Actually, the designation of polarities does not have independent significance as long as their designation is consistent.

The output of each signal generator 30 is applied across a potentiometer 32 whose arm 34 is connected to an input resistor 36. The potentiometer may vary in value between 10,000 and 100,000 ohms. Each of the resistors 36 is connected to the base lead of a transistor 38 for the excitatory indirect signals, and a transistor 40 for inhibitory indirect signals. The generator 30, the potentiometer 32, the arm 34, and the input resistor 36 comprise an input circuit 42 which provides indirect signals to the following circuitry. There can be as many of these input circuits as are desired, but only two of each type are shown. The number utilized is limited only by the circuit being simulated and by the operating range of associated components giving satisfactory performance.

The collector lead of the transistor 38 is connected to a suitable source of positive potential 44, which can be a positive 24 volts, by a resistor 46. A negative feedback loop 48 connects the collector lead to the base lead of each transistor 38 and 40, and comprises a capacitor 50, a resistor 52 and a potentiometer 54. The capacitor 50 is connected in parallel with the series connected resistor 52 and potentiometer 54. The base lead of the transistor 38 is connected to the source of positive potential 44 by a resistor 56. The collector lead of the transistor 40 is connected to a source of negative potential 58, which can be a negative 24 volts, by a resistor 60. The base lead of the transistor 40 is connected to the potential source 58 by a resistor 62. The emitter of each transistor 38 and 40 is connected to ground by a similar resistor 64.

The transistor 38 and its associated feedback loop 48 operate with excitatory indirect signals in a similar way, as the transistor 40 and its feedback loop 48 operate with inhibitory indirect signals. Each transistor and its feedback loop comprises a low quality operational amplifier which shapes the pulses applied thereto, provides a source of pulses of opposite polarity, and allows the application of successive input pulses without mutual interference between resultant output signals and the input signals.

The transfer function of each operational amplifier and the resistor 36 is $$\frac{K}{TS+1}$$

as written in well-known Laplace nomenclature. A change in the value of the resistance, contributed by the 5 megohm potentiometer 54, will change the time constant T in the transfer function, and thereby cause the electronic model to simulate the operation of various cells. In the instant discussion of the electronic model, the time constant T is set in range of 50 to 200 milliseconds and is representative of the time constant found in an Aplysia neuron. The time constant can be reduced to the range of 0.5 to 2.0 milli-seconds which corresponds to the time constant associated with a nerve cell of a cat. All the other nerve cells, which range between the Aplysia and the cat, can be simulated by the proper adjustment of the time constant T to equal the time constant of the cell to be simulated.

The collector leads of both transistors 38 and 40 are connected to the base lead of a transistor 65 by means of a similar resistor 66. The base lead of transistor 65 is also connected to the potential source 58 by a potentiometer 68. The emitter lead of the transistor 65 is connected to potential source 58 by a resistor 70. The collector lead of the transistor 65 is connected to the source of positive potential 44 by a resistor 72. The transistor 65 serves to provide active gain, to sum all the excitatory and inhibitory synaptic inputs and to provide correct polarity inversion.

The Synapse 2 is an intermediate source of initiating signals and is connected to an operational amplifier 74 by a resistor 76. The operational amplifier 74 and a negative feedback loop 78 produce a transmembrane voltage which may comprise an "Action Potential," under conditions to be described hereinafter. The feedback loop 78 connects the output of the amplifier 74 to its input and consists of resistors 80 and 82, and capacitors 84, 86, and 88. The output of amplifier 74 is connected to its input by the pair of series connected resistors 80 and 82. The capacitor 84 is connected in parallel with the resistor 80, and the capacitor 86 is connected in parallel with the resistor 82. The junction of the parallel connected resistor 80 and capacitor 84 with the parallel connected resistor 82 and capacitor 86 is connected to ground through the capacitor 88.

A signal generator 90 is connected to the input of amplifier 74 by a resistor 92 and is the source of non-synaptic direct input signals. These direct signals also may activate the operational amplifier and cause it to produce an "Action Potential" under various sets of circumstances.

The transfer function of the command and directory input signals, and the feedback loop 78, when the gain of the operational amplifier 74 greatly exceeds 1, may be written in Laplace nomenclature, as $$\frac{V_{(s)}}{V_{in(s)}} = \frac{-K(T_1 S+1)}{T_2^2 S^2 + 2\zeta T_2 S + 1}$$

where $\zeta$ = a constant 1.2 and $K$ = is dependent upon the voltage scale employed and the mode of operation chosen.

The time constants $T_1$ and $T_2$ may be changed so that this area of the cell may simulate the action of any presently known nerve cell from an Aplysia to a cat's. The time constant $T_1$ for an Aplysia cell is 0.036, while for a cat's cell is 0.003, and the time constant $T_2$ for an Aplysia cell is 0.0055 while for a cat's cell it is 0.0005. Time constants $T_1$ and $T_2$ may be varied by changing the values of the components in the feedback loop 78, and need not be exactly as given, for these values are not critical.

The output of the amplifier 74 is connected to a pair of steering diodes 94 and 96 in FIG. 2B. The diode 94 is able to pass positive going signals and is connected to the base lead of a transistor 98 by a series connected proportional plus derivative circuit 99 and a biasing resistor 100. The diode 96 is able to pass negative going signals and is connected to the base of a transistor 102 by a proportional plus derivative circuit 104. Each of these two circuits, 99 and 104 regulates the amount of accommodation exhibited by the cell depending upon the polarity of the input signal and consists of a 22,000 ohm resistor 106 and a .2 micro-farad capacitor 108. These values will change or will be done away with, depending upon the nerve cell to be simulated. The value of the resistor 106 and the capacitor 108 depends upon the amount of accommodation exhibited by the nerve cell to be simulated.

The threshold reference circuit 18 is connected to a pair of steering diodes 112 and 114. The current path through diode 112 provides a positive threshold operating voltage. The diode 112 is connected to the base lead of the transistor 98 by means of the resistor 100. The current path through diode 114 provides a negative threshold operating voltage, said diode 114 is connected directly to the base lead of the transistor 102. The base lead of transistor 102 is connected to ground by a biasing resistor 116. The junction of the proportional plus derivative circuit 99 and the resistor 100 is connected to ground by a resistor 118. The emitter lead of transistor 98 is connected to the emitter lead of transistor 102, and their junction is connected to the negative source of potential 58 by a biasing resistor 120. The collector lead of transistor 98 is connected to the positive source of potential 44 by a resistor 122, while the collector lead of the transistor 102 is connected directly to the same source of potential 44.

The collector lead of transistor 98 is connected to the base lead of a transistor 124 by a resistor 126. The base lead of this transistor is also connected to the source of potential 58 by a biasing resistor 127. The emitter lead of transistor 124 is connected to ground by a line 128 and the collector lead of the transistor 124 is connected to the negative source of potential 58 by a resistor 129.

Immediately following this transistor amplifier 130 is a second transistor amplifier 130' that is identical in construction to the first, so that this amplifier will not be independently described but components will be given prime numbers of those assigned to the identical parts in the first amplifier. The only difference in this stage of amplification is that the resistor 127' is connected to the positive source of potential 44.

The transistors 98, 102, 124 and 124' together with their input and biasing circuits, comprise the trigger circuit for a single-shot multivibrator which will be described later, and operate according to the usual technique associated with such a circuit. This trigger circuit will change its state of conduction when the output from the proportional plus derivative circuit exceeds the threshold biasing voltage from the threshold reference voltage circuit 18.

The collector lead of the transistor 124' is connected to the base lead of a transistor 131 by a diode 132, and to base lead of a transistor 134 by the diode 132 connected in series with a resistor 136. The base lead of the transistor 131 is connected to the potential source 44 by a biasing resistor 138. The emitter lead of the transistor 131 is connected to ground by a line 139 and the collector lead of this transistor is connected to the potential source 58 by a resistor 140. The collector lead of the transistor 131 is connected to the collector lead of a transistor 142 by a capacitor 144 and a resistor 146 in series relationship. The collector lead of the transistor 142 is also connected to the potential source 58 by a resistor 148. The emitter lead of transistor 142 is connected to ground by a resistor 150.

The base lead of a transistor 152 is connected to the junction of the capacitor 144 and the resistor 146. The emitter lead of the transistor 152 is connected to ground by a line 153, and the collector lead of the transistor 152 is connected to the potential source 58 by a resistor 154. The collector lead of transistor 152 is connected directly to the base lead of the transistor 134 by a line 155 and may be connected to the base lead of the transistor 142 by a resistor 156, in series with the switch 25. The base lead of the transistor 142 is connected to the potential source 44 by a biasing resistor 158, and to ground by a capacitor 160 and a resistor 162 in series relationship. A diode 164 is connected to the junction of the capacitor 160 and the resistor 162. This diode provides a discharging path different than the charging path for transistor 142, and causes the characteristic known as "facilitation."

The transistor 142 and its associated circuitry help reproduce the "facilitation" characteristic of a cell when switch 25 is closed. Since the "Action Potential" of the simulation is achieved by a feedback of the form of a rectangular pulse from the single-shot multivibrator 22, as seen in FIG. 1, "facilitation" may be achieved by controlling the single-shot pulse width as a function of the number of pulses in a given period of time. The pulse width of a single-shot multivibrator is controlled by an R-C time constant and by the voltage reference to which the capacitor in the time constant network charges. By controlling the reference voltage to which the capacitor charges as a function of the number of pulses, the pulse width is also a function of the number of pulses. In the present invention this is readily accomplished in the following manner.

When the single-shot multivibrator is triggered by an output voltage of the amplifier 74 that exceeds the threshold voltage from the threshold input circuit 18, said multivibrator produces a rectangular pulse of a known amplitude and width. This pulse is then applied to the transistor 142 which has a charging transfer of $$\frac{K}{T_1 S}+1$$

and a discharge transfer of $$\frac{K}{T_2 S}+1$$

is written in Laplace nomenclature. By making the ratio of $T_1$ to $T_2$ very small, the circuit is essentially an integrate-and-hold circuit. The output voltage from this circuit is then used to change the reference voltage to which the multivibrator's time constant capacitor 144 is tending to charge. Therefore the pulse width of the multivibrator is changed by the above transfer relationships. This method allows the pulse width to be widened or shortened as a function of whether the reference voltage is increased or decreased. The form of "facilitation" duplicated here requires an effective increase in the reference voltage.

The time constant $T_1$ is primarily determined by the value of the resistor 156 and the capacitor 160, and the time constant $T_2$ is primarily determined by the value of the resistors 162, 156, and 158, and the capacitor 160.

The emitter lead of transistor 134 is connected to the potential source 58 by a resistor 166, and the collector lead of this transistor is connected to both the potential source 44 by a resistor 168, and to ground by a diode 170. The diode is so connected as to prevent the collector potential from attaining a negative value.

The base lead of a transistor 172 is connected to the base lead of the transistor 134 by a line 174. The collector lead of the transistor 172 is connected to potential source 58 by a line 176. The emitter lead of the transistor 172 is connected to the input of the amplifier 74 in FIG. 2A by a series connected diode 177 and a resistor 178. The diode 177 passes negative going pulses from the transistor 172, which are produced by the single-shot multivibrator, and initiates an "Action Potential." The single-shot multivibrator is comprised of transistors 131, 134 and 152.

The base lead of a transistor 179 in FIG. 2B is connected to the junction of the diode 170, the resistor 168 and the collector lead of the transistor 134. The collector lead of the transistor 179 is connected to the potential source 44 by a line 180. The emitter lead of the transistor 179 is connected to ground by a series connected diode 181 and a potentiometer 182 in FIG. 2A. A diode 183, a resistor 184 and a capacitor 186 are connected in series between the arm of the potentiometer 182 and ground. The junction of the capacitor 186 and the resistor 184 is connected to the input of the amplifier 74 by a resistor 188.

The resistors 188 and 184, the capacitor 186, the diode 183 and the potentiometer 182 form the hyperpolarizing feedback loop 28, as shown in FIG. 1. This feedback loop has a charging time constant different from its discharging time constant, caused by the insertion of the diode 183 in the charging path. By adjusting the ratio of the two time constants in the hyperpolarizing feedback and the gain, which is a function of the potentiometer 182, it is possible to control the steady state rate of producing "Action Potentials" for various constant depolarizing direct signals, and to control alternate periods of producing "Action Potentials" and periods of no "Action Potentials." The charging time constant is determined primarily by the resistor 184 and the capacitor 186, and the discharging time constant is determined by the resistor 188 and the capacitor 186.

Figure 3:
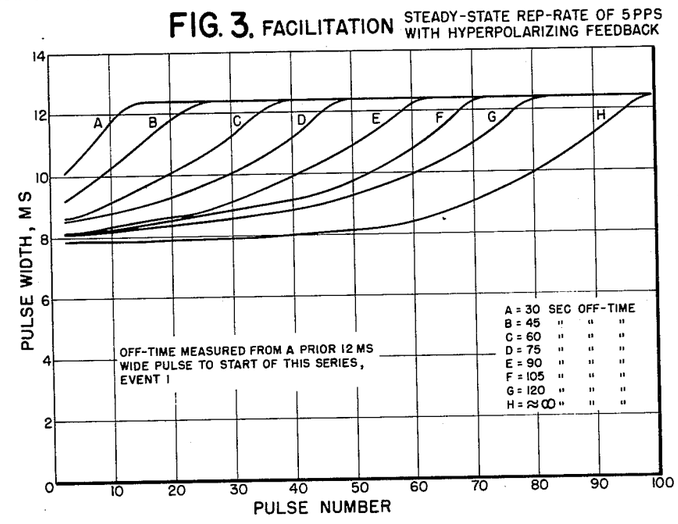
FIG. 3 is a graphic representation including representative curves showing a characteristic of the instant invention known as facilitation.

Referring to FIG. 3, there can be seen a sample graphic representation of the instant invention, demonstrating the characteristic referred to hereinabove as "facilitation." The abscissa is labeled in number of pulses, and the ordinate is labeled as pulse width in milli-seconds. This graph shows how the width of the "Action Potential" reaches a maximum value for different pulse numbers, depending on the length of time the neuron does not produce "Action Potentials" between a series of pulses. FIG. 3 is obtained by applying a depolarizing indirect input signal which will produce a steady state repetition rate of five pulses per second. By increasing the input rate to ten or fifteen pulses per second, for example, the graph will generally shift to the left, and some spreading of the curves will be noticed at the fifteen-per-second rate.

Figure 4:
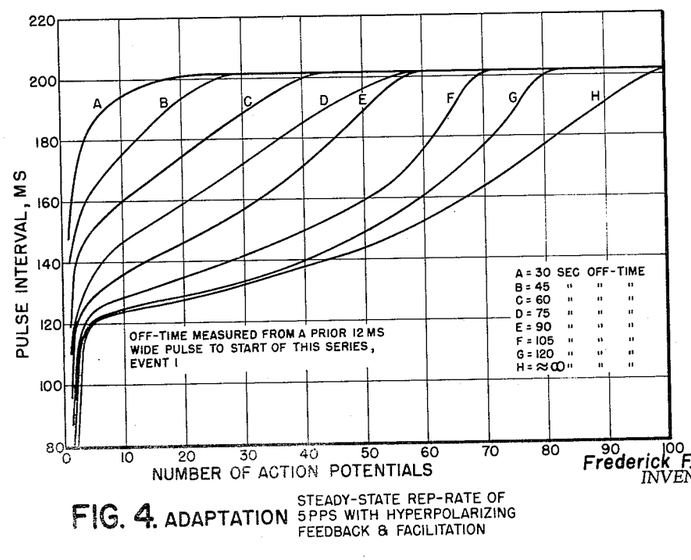
FIG. 4 is a graphic representation of a plurality of representative curves showing the adaptation characteristic of the instant invention as it pertains to direct input signals.

Referring to FIG. 4, there can be seen the graphic representation of the operation of the instant invention, demonstrating one form of its characteristic referred to as adaptation. This figure shows that for a depolarizing indirect input signal which results in a steady state repetition rate of five pulses per second, for example, the operational amplifier 16 produces a series of "Action Potentials" that at first occur at a rate faster than the steady state value, and that with time will slow down to the steady state rate. The abscissa is labeled in number of "Action Potentials" and the ordinate is labeled pulse interval in milli-seconds.

Figure 5:
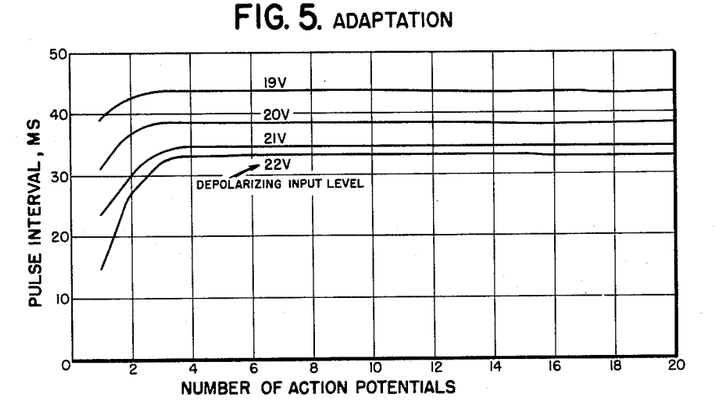
FIG. 5 is a graphic representation illustrating by representative curves the adaptation characteristic of the instant invention as it pertains to direct input signals, but without hyperpolarizing feedback and facilitation.

Referring to FIG. 5, there can be seen a sample graphic representation of the operation of the instant invention under the influence of a depolarizing indirect input signal, but without hyperpolarizing feedback or facilitation. The abscissa is labeled in number of "Action Potentials" and the ordinate is labeled pulse interval in milli-seconds.

Figure 6:
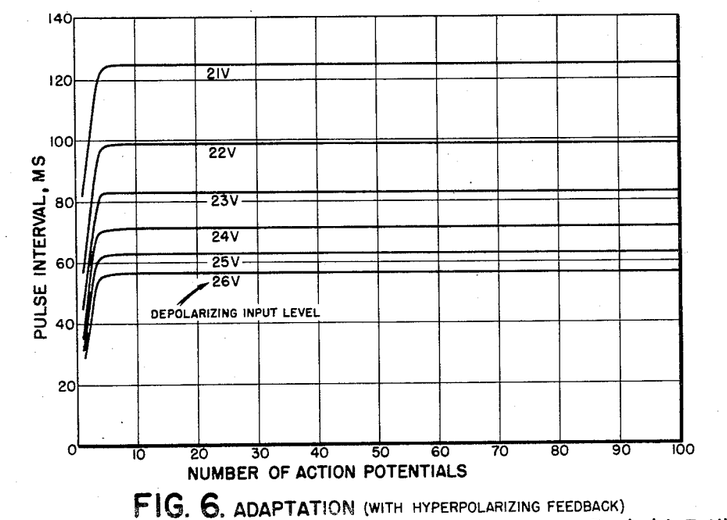
FIG. 6 is a graphic representation showing the effect of a hyperpolarizing feedback signal upon the adaptation characteristic of the instant invention, as it pertains to direct input signals.

Referring to FIG. 6, there can be seen a sample graphic representation of the operation of the instant invention during "adaptation." The abscissa is labeled, "number of 'Action Potentials'," and the ordinate is labeled, "pulse interval in milli-seconds." Comparing FIG. 5 with FIG. 6, it can be seen that the hyperpolarizing feedback loop reduces the steady state rate of producing "Action Potentials" and increases the time to reach a steady state level.

Figure 7:
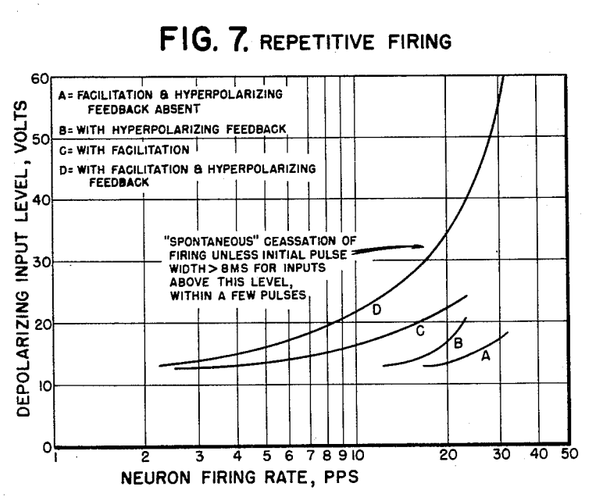
FIG. 7 is a graphic representation of the effect of various additional forms of feedback upon the repetitive firing rate of the instant invention, as they pertain to a direct input signal.

Referring to FIG. 7, there can be seen a sample graphic representation of the operation of the instant invention having varying characteristics in the rate of producing "Action Potentials." The abscissa of the graph is labeled "neuron firing rate in pulses per second," and the ordinate is labeled "depolarizing input level in volts." This graph illustrates the different rates of firing depending on the different types of feedback loops that are connected into the electronic model for given voltage levels of depolarizing signals.

Figure 8:
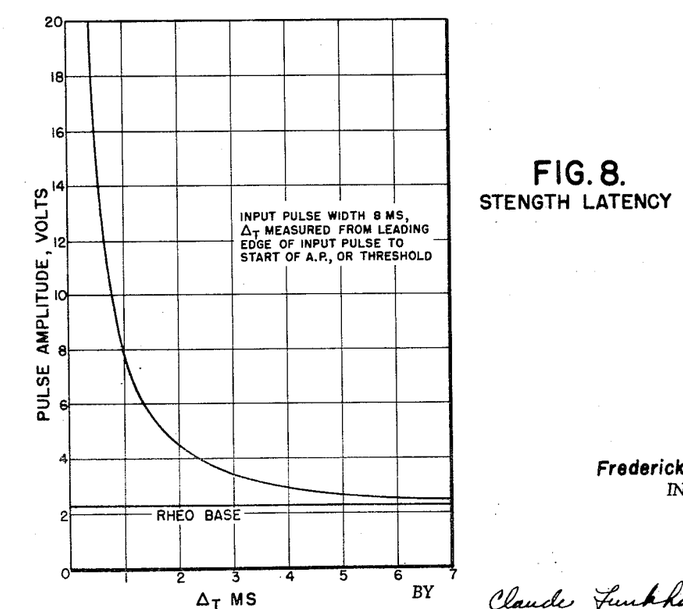
FIG. 8 is a graphic representation of a characteristic of the instant invention known as strength latency.

When an input pulse is applied to the operational amplifier, as seen in FIG. 1, through the amplifier 10 or the non-synaptic input network 27, the time to elicit an "Action Potential" is dependent upon the amplitude of the applied pulse and upon its width. That is, the time lapse, or latency, is a function of impulse strength. For a given pulse width, for example, an "Action Potential" will be elicited much sooner for an input pulse amplitude which is larger than another. Referring to FIG. 8, there can be seen a graphic representation of the operation of the instant invention concerning the strength latency of the electronic model, for non-synaptic input. The abscissa of the graph is labeled "time needed to react in milli-seconds," and the ordinate of graph is labeled in volts. The minimum level of impulse strength required to elicit an "Action Potential" is termed the "Rheo Base," and is shown as the dotted line in FIG. 8.

Figure 9:
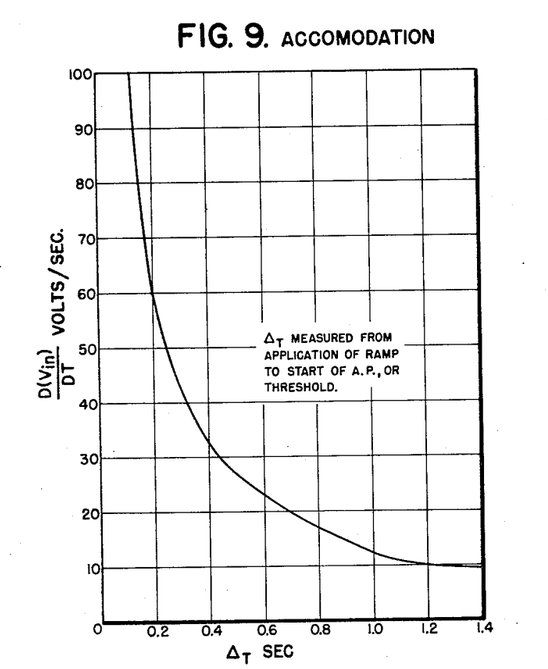
FIG. 9 is a graphic representation of a characteristic of the instant invention known as accommodation.

If a depolarizing ramp stimulus is applied to the neuron, instead of a step stimulus, the time to produce an "Action Potential" and the apparent threshold voltage are functions of the ramp rate. These relationships are not linear and are known as "accommodation." Furthermore, amplitudes of the applied voltages are not at the same level at time of firing. Referring to FIG. 9 there can be seen the graphic representation of one form of the operation of the instant invention according to "accommodation." The abscissa of the graph is labeled "time required to react in milli-seconds"; and the ordinate of the graph is labeled "change in voltage per second of the applied direct input signal."

Figures 10, 11:
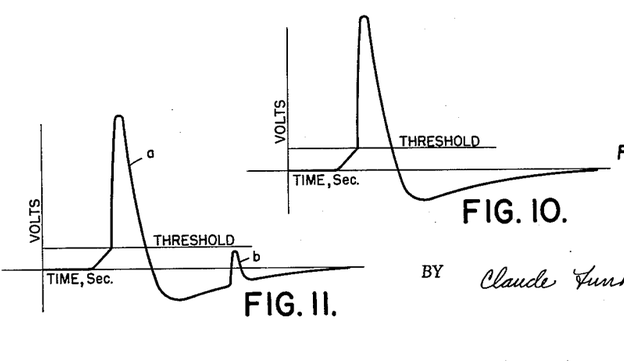
FIG. 10 shows the waveform of an isolated "Action Potential" as produced by the instant invention.
FIG. 11 shows a characteristic of the instant invention known as refractoriness.

Referring to FIG. 10, there may be seen a graphic representation of an "Action Potential" produced by the instant invention. The abscissa is labeled time, and the ordinate is labeled volts. The portion of the curve in the graph that is above the threshold value is the period of the "Action Potential." The portion of the curve from the maximum point below the threshold value back to the resting level is the refractory region. If an input is applied to the invention, while it is in the refractory region, the amplitude of this input must be larger to cause another "Action Potential" than it would be if it had occurred outside the refractory time for equal pulse width. There is a period during the falling phase of the "Action Potential" which is absolutely refractive, that is, the neuron model will not fire again to any input. The remainder of the refractory period is termed the relative refractory period. It is relative because the neuron model may be made to fire again if an input is applied which is sufficient to raise the output potential of the operational amplifier 16, as seen in FIG. 1, above the threshold voltage furnished by the threshold voltage reference circuit 18. The required amplitude to exceed the threshold voltage is related to where in the refractory period the subsequent input pulse occurs. For the present neuronal simulation, the refractory period is 40 milli-seconds measured from the peak of the undershoot to the point of return to the zero resting level.

Referring to FIG. 11 there can be seen a graph that illustrates the operation of the neutron model during its refractory period. A first input pulse generates an "Action Potential" $a$, but a second input pulse of the same amplitude and width which is applied during the refractory period, caused by the pulse $a$, does not generate an "Action Potential" $a$, but only a smaller pulse $b$.

Since the charging and discharging time constants of the transistor 38, as seen in FIG. 2, are unequal, there will be a "saturation" level at the output of the amplifier 74 which will vary will the gain of the synapse simulation and with the frequency of the driving source. This "saturation" is obviously caused by a second, third, fourth, etc., input arriving on a single synaptic pathway before the effects of the prior inputs have decayed away. A level may therefore be reached for a given frequency of normally sub-threshold inputs where an "Action Potential" may be produced because the resultant effect exceeds threshold.

Figure 12:
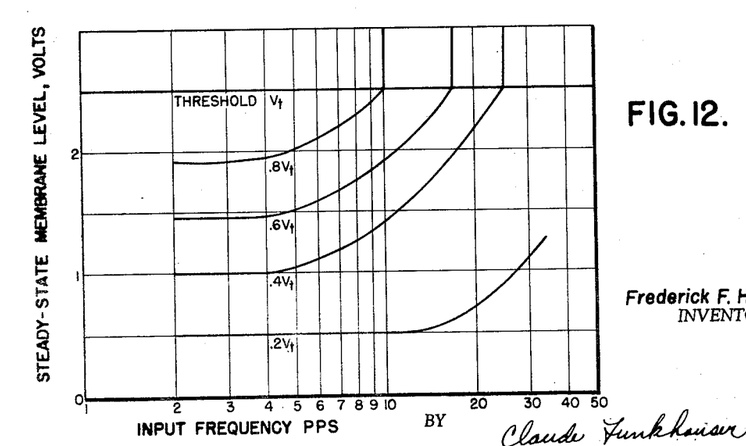
FIG. 12 is a graphic representation showing that the repetitive application of subthreshold indirect signals may eventually trigger an "Action Potential."

Referring to FIG. 12, there can be seen a representative graph showing the reaction of the instant invention to a series of pulses, each of which is not sufficient in itself to produce an "Action Potential," but may gradually build up to produce an "Action Potential."

Obviously, many modifications and variations of the present invention are possible in the light of the above teachings. It is therefore to be understood that within the scope of the appended claims the invention may be practiced otherwise than as specifically described.

What is claimed is:

1. An electronic simulation of a neuron, comprising, means for producing an Action Potential,
means for providing direct depolarizing signals,
means for establishing a minimum operating level for said producing means,
means for initiating said Action Potential,
means for comparing said establishing means with said providing means,
means for triggering said initiating means,
means for regulating said triggering means,
means for adjusting the initiating signal to said producing means, and
means for extending the lower frequency response of said producing means.

2. An electronic simulation of a neuron, comprising, means for producing an Action Potential,
means for providing a plurality of subthreshold indirect excitatory signals,
means for providing a plurality of subthreshold indirect inhibitory signals,
means for providing direct depolarizing signals,
means for accumulating a plurality of said excitatory signals and said inhibitory signals,
means for summing said accumulated excitatory signals and said accumulated inhibitory signals,
means for establishing a minimum operating level for said producing means,
means for comparing said establishing means with said summing means and said direct signal providing means,
means for initiating said Action Potential,
means for triggering said initiating means,
means for regulating said triggering means,
means for adjusting the initiating signal to said producing means, and
means for extending the lower frequency response of said producing means.

3. An electronic simulation of a neutron, comprising, means for producing an Action Potential,
means for providing indirect excitatory signals for said producing means,
means for providing direct depolarizing signals for said producing means,
means for establishing a minimum operating level for said producing means,
a single shot multivibrator for initiating said Action Potential,
means for comparing said establishing means with said providing means,
means for triggering said single shot multivibrator when said minimum level is exceeded,
means for regulating said triggering means, and means for controlling the operation of said producing means.

4. An electronic simulation of a neuron as claimed in claim 3, wherein said controlling means further includes means for extending the lower frequency response of said producing means comprising,
a passive hyperpolarizing network having a charging circuit, and
a separate discharging circuit,
said charging circuit having a time constant $T_1$,
said discharging circuit having a time constant $T_2$,
said time constant $T_2$ being greater than time constant $T_1$.

5. An electronic simulation of a neuron as claimed in claim 3, wherein said controlling means further includes,
means for adjusting the reference voltage to which said multivibrator is tending to charge,
said adjusting means having a charging time constant $T_1$ and a discharging time constant $T_2$,
said time constant $T_2$ being much greater than time constant $T_1$, and
said reference voltage being adjusted as a function of the ratio of time constant $T_1$ to $T_2$.

6. An electronic simulation of a neuron as claimed in claim 3, wherein said indirect excitory signals providing means further includes means for shaping said indirect signals, comprising,
a transistor amplifier,
an input charging circuit to said amplifier having a time constant $T_1$,
a discharging circuit to said amplifier having a time constant $T_2$,
said time constant $T_1$ being less than said time constant $T_2$,
whereby the ratio of said time constants determine the delay between the provision of said indirect signals and producing of said Action Potential.

7. An electronic simulation of a neuron, comprising,
producing means for producing an output Action Potential,
activating means for supplying activating input signals and including both indirect synaptic input means and indirect non-synaptic input means,
meas responsive to the input signals from said activating means for determining whether said producing means should produce an output Action Potential in response thereto, and
means responsive to said determining means for controlling said producing means to produce said Action Potential.

8. An electronic simulation of a neuron, comprising,
means for producing an output Action Potential,
means for providing excitatory input signals,
means for establishing a minimum operating level for said producing means,
means operably connected to said producing means for initiating production of said Action Potential,
means operably connected to compare said excitatory input signals with the operating level established by said establishing means,
means responsive to said comparing means for triggering said initiating means to begin production of an Action Potential when said excitatory input signals exceed said established operating level, and
control means operably connected to said producing means for controlling the operation of said producing means to vary the frequency with which said producing means will produce successive Action Potentials and to vary the duration of said Action Potentials dependent upon said production frequency.

9. An electronic simulation of a neuron as recited in claim 8, wherein
said initiating means generates a pulse signal whose width determines the duration of the Action Potential produced by said producing means, and wherein,
said controlling means is effectual to adjust the width of said pulse signal generated by said initiating means dependent upon the frequency with which said producing means produces said Action Potentials,
whereby the duration of each Action Potential is varied according to the number of Action Potentials then being produced in a given time period.

10. An electronic simulation of a neuron as recited in claim 8, wherein
said controlling means further includes means for extending the lower frequency response of said producing means,
whereby said producing means assumes a lower steady state frequency of producing said Action Potentials.

11. An electronic simulation of a neuron as recited in claim 8, wherein said comparing means further includes means for regulating the interval delay between the beginning of the comparison period and the beginning of the triggering period.

12. An electronic simulation of a neuron, comprising,
means for producing an output Action Potential,
a source of activating input signals,
means for establishing an operating threshold level for said producing means,
means operably connected to compare said activating input signals with said threshold level,
means responsive to said comparing means for initiating production of said Action Potential when said activating input signals exceed said threshold level, and
control means responsive to the output of said producing means for varying the duration of said Action Potential dependent upon the number of Action Potentials produced in a given time period.

References Cited by the Examiner
UNITED STATES PATENTS

| | | | |
|---|---|---|---|
| 3,097,349 | 7/1963 | Putzrath et al. | 340—172.5 |
| 3,165,644 | 1/1965 | Clapper | 307—88.5 |

OTHER REFERENCES

Pub. I: "Report on Bionics" in Electronic Design dated Sept. 14, 1960, page 40.

ARTHUR GAUSS, *Primary Examiner.*